(12) United States Patent
Smith et al.

(10) Patent No.: US 10,713,495 B2
(45) Date of Patent: Jul. 14, 2020

(54) VIDEO SIGNATURES BASED ON IMAGE FEATURE EXTRACTION

(71) Applicant: Adobe Inc., San Jose, CA (US)

(72) Inventors: Kevin Gary Smith, Lehi, UT (US); William Brandon George, Pleasant Grove, UT (US)

(73) Assignee: Adobe Inc., San Jose, CA (US)

( * ) Notice: Subject to any disclaimer, the term of this patent is extended or adjusted under 35 U.S.C. 154(b) by 212 days.

(21) Appl. No.: 15/919,769

(22) Filed: Mar. 13, 2018

(65) Prior Publication Data

US 2019/0286911 A1  Sep. 19, 2019

(51) Int. Cl.
G06K 9/46  (2006.01)
G06K 9/00  (2006.01)

(52) U.S. Cl.
CPC ....... *G06K 9/00744* (2013.01); *G06K 9/4652* (2013.01)

(58) Field of Classification Search
None
See application file for complete search history.

(56) References Cited

U.S. PATENT DOCUMENTS

| | | | |
|---|---|---|---|
| 8,094,872 B1 | 1/2012 | Yagnik et al. |
| 8,175,413 B1 | 5/2012 | Ioffe et al. |
| 8,229,219 B1 | 7/2012 | Ioffe |
| 8,340,449 B1 | 12/2012 | Yagnik et al. |
| 8,490,128 B2 | 7/2013 | Davis et al. |
| 8,516,533 B2 | 8/2013 | Davis et al. |
| 8,528,036 B2 | 9/2013 | Davis et al. |
| 8,532,382 B1 | 9/2013 | Ioffe |
| 8,611,422 B1 | 12/2013 | Yagnik et al. |
| 8,611,689 B1 | 12/2013 | Yagnik et al. |
| 8,737,679 B2 | 5/2014 | Subramanian et al. |
| 8,739,208 B2 | 5/2014 | Davis et al. |
| 8,934,734 B1 | 1/2015 | Ioffe et al. |
| 8,947,595 B1 | 2/2015 | Tucker et al. |
| 9,094,719 B2 | 7/2015 | Davis et al. |
| 9,135,674 B1 | 9/2015 | Yagnik et al. |
| 9,237,368 B2 | 1/2016 | Davis et al. |
| 9,282,357 B2 | 3/2016 | Davis et al. |
| 9,319,740 B2 | 4/2016 | Sinha et al. |
| 9,420,328 B2 | 8/2016 | Davis et al. |
| 9,438,949 B2 | 9/2016 | Davis et al. |
| 9,462,341 B2 | 10/2016 | Davis et al. |
| 9,473,796 B1 | 10/2016 | Vlad et al. |
| 9,838,753 B2 | 12/2017 | Neumeier et al. |
| 9,940,973 B2 | 4/2018 | Roberts et al. |
| 9,955,192 B2 | 4/2018 | Neumeier et al. |

(Continued)

*Primary Examiner* — Idowu O Osifade
(74) *Attorney, Agent, or Firm* — Finch & Maloney PLLC

(57) ABSTRACT

Techniques are disclosed for identifying a video using a video signature generated using image features derived from a portion of the video. In some examples, a method may include determining image features derived from a portion of a video, determining a video frame sequence of the video, and generating the video signature of the video based on the image features and the video frame sequence. The method may further include deriving a curve for the video based on the image features and the video frame sequence, and comparing the derived curve with one or more curves corresponding to respective one or more reference videos.

20 Claims, 11 Drawing Sheets
(6 of 11 Drawing Sheet(s) Filed in Color)

(56) References Cited

U.S. PATENT DOCUMENTS

| | | |
|---|---|---|
| 9,955,215 B2 | 4/2018 | Davis et al. |
| 2008/0019577 A1 | 1/2008 | Kim et al. |
| 2008/0310731 A1* | 12/2008 | Stojancic ............ G06K 9/00711 382/195 |
| 2009/0052784 A1 | 2/2009 | Covell et al. |
| 2009/0193124 A1 | 7/2009 | Larsson et al. |
| 2010/0169358 A1 | 7/2010 | Zhang |
| 2010/0215210 A1 | 8/2010 | Zhang |
| 2010/0215211 A1 | 8/2010 | Zhang |
| 2010/0265390 A1 | 10/2010 | Zhang |
| 2012/0123786 A1 | 5/2012 | Valin et al. |
| 2013/0163957 A1 | 6/2013 | Ikizyan et al. |
| 2013/0177199 A1 | 7/2013 | Subramanian et al. |
| 2013/0208942 A1 | 8/2013 | Davis |
| 2013/0247085 A1 | 9/2013 | Lee et al. |
| 2013/0259228 A1 | 10/2013 | Ren et al. |
| 2013/0330057 A1 | 12/2013 | Ikizyan et al. |
| 2014/0007156 A1 | 1/2014 | Navin et al. |
| 2014/0150021 A1 | 5/2014 | Subramanian et al. |
| 2014/0195548 A1 | 7/2014 | Harron |
| 2015/0202150 A1 | 7/2015 | Mitra et al. |
| 2016/0133299 A1 | 5/2016 | Yalniz et al. |
| 2016/0210716 A1 | 7/2016 | Ghosh et al. |
| 2016/0241933 A1 | 8/2016 | Harrison |
| 2016/0381435 A1 | 12/2016 | Navin et al. |
| 2017/0024470 A1 | 1/2017 | Harron |
| 2017/0251249 A1 | 8/2017 | Seo et al. |
| 2017/0371963 A1 | 12/2017 | Bilobrov |
| 2017/0372142 A1 | 12/2017 | Bilobrov |
| 2018/0068410 A1* | 3/2018 | Pavetic ................ G06K 9/4604 |
| 2018/0082125 A1 | 3/2018 | Katz et al. |
| 2018/0109841 A1 | 4/2018 | Seo et al. |
| 2018/0310057 A1 | 10/2018 | Seo et al. |

* cited by examiner

VIDEO SIGNATURES BASED ON IMAGE FEATURE EXTRACTION

FIELD OF THE DISCLOSURE

This disclosure relates generally to identifying multimedia, and more particularly, to video identification using video signatures.

BACKGROUND

Proliferation of video content on the Internet has driven the need for reliable and efficient identification of video content. For example, proper identification of videos may be useful in the area of anti-piracy (e.g., tracking the distribution and use of unauthorized videos) to identify duplicate or near-duplicate videos, or portions of videos. Proper identification may also be useful in areas of analytics to determine video viewing tendencies (e.g., how many times the video was played, where the video was played, when the video was played, etc.). To this end, video fingerprinting has emerged as one viable technology for identifying and comparing videos.

Video fingerprinting refers to a technique of uniquely identifying videos based on various features of the videos. Unlike watermarking, video fingerprinting does not rely on any additions or changes to the video. A video fingerprint (also commonly referred to as a "video signature") is a compact representation of the features of a video that can be used to distinguish the video from perceptually different videos. As such, a video fingerprint should ideally possess certain properties. For example, a video fingerprint should be robust in that a fingerprint extracted from a degraded video should be similar to the fingerprint of the original video. Similarly, a video fingerprint should be reliable in that two videos that are perceptually different should have different fingerprints. A video fingerprint should also be efficient in that a fingerprint should be suitable for fast and reliable database search. Unfortunately, there is a lack of video fingerprinting solutions that possess these properties.

SUMMARY

According to some examples, systems to generate a video signature of a video are described. An example system may include a feature selection module to determine image features to use in generating the video signature, where the image features are derived from a portion of the video. The system may also include a sequence selection module to determine a video frame sequence of the video to use in generating the video signature, and a signature generation module to generate the video signature of the video based on the determined image features and the video frame sequence.

BRIEF DESCRIPTION OF THE DRAWINGS

The patent or application file contains at least one drawing/photograph executed in color. Copies of this patent or patent application with color drawing(s)/photograph(s) will be provided by the Office upon request and payment of the necessary fee.

The accompanying drawings are not intended to be drawn to scale. In the drawings, each identical or nearly identical component that is illustrated in various figures is represented by a like numeral, as will be appreciated when read in context.

Figure 1:
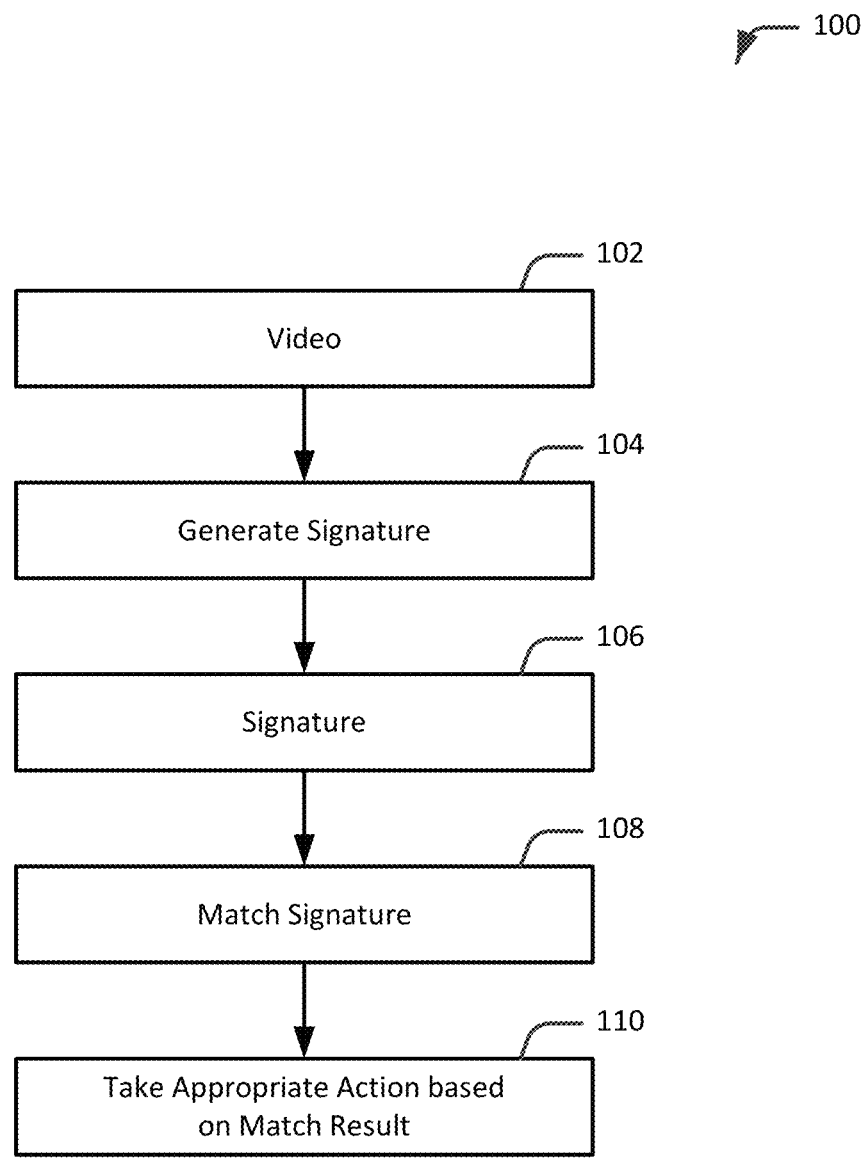
FIG. 1 illustrates an example signature matching process workflow, in accordance with an embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

Techniques are disclosed for identifying a video using a video signature (also referred to herein as a signature for brevity) generated using image features derived from a portion of the video. The video may be a digital video and/or an analog video. An image feature of a given video can be represented, for example, with one or more pixels within a frame of a video, or one or more color schemes within a frame of the video. A so-called portion of a video may be, for example, a small region of each video frame (also referred to herein as a frame for brevity) of the video, or a small regions of select video frames of a video. In a more general sense, according to various embodiments, a signature of a video is generated from a portion, and in some instances, a relatively small portion, of the image contents of the video. Upon generating a video signature of a video, the video signature may be matched against a database of known video signatures to determine whether the video is among the reference videos in the database. The disclosed techniques facilitate the generation and utilization of robust and reliable video signatures in a computationally efficient manner.

According to an embodiment described herein, a signature of a video may be based on a small number of pixels of each video frame of the video. That is, the image features may be pixel values, and the signature may be generated using pixel values from a small number of pixels in each video frame of the video. For example, instead of using pixel values from every pixel in a video frame, pixel values from a small number of pixels in the video frame may be used to generate the signature. In some such embodiments, the selected small number of pixels may be pixels in the video frames whose pixel values are expected to change frequently on a frame by frame basis. In other such embodiments, the selected pixels may be, for example, an arbitrary or otherwise pre-established subset of pixels in the video frames. For instance, the video signature can be generated based on 5 to 35 percent of all pixels in a frame, or every other pixel in the frame on a row-wise basis, or every tenth pixel in the frame on a row-wise basis, or pixels in every other row or column of the frame, or pixels in every fifth row or column of the frame, or a selected number of pixels within a specified distance, such as 20,000 pixels, 25,000 pixels, 30,000 pixels, etc., from a center of a video frame, etc. In some embodiments, the selected small number of pixels may be pixels in a region of the video frames having a relatively higher expected frame to frame color variance. In other embodiments, the frames may be divided into a select number of sections, and the selected pixels may include the pixels in the middle of each section of the frame, the pixels near the middle of each section of the frame, or the pixels at the intersection of two or more sections in the frame, etc. Numerous other specific such pixel-based signature embodiments will be appreciated. Generating a signature based on a small number of pixels provides significant computational benefits. Additionally, using a carefully selected subset (e.g., small number) of pixels likely ensures generation of unique signatures across a very large and even significantly large number of videos.

To further increase computational efficiency, according to an embodiment of the present disclosure, a subset of the frames of a video may be used in generating a signature of the video, rather than all the frames. For example, instead of using pixels from each video frame of the video, pixels from some of the video frames of the video may be used to generate the signature. According to some embodiments, the portion of the video may be a sequence of a subset of video frames, such as every $2^{nd}$, $3^{rd}$, or $n^{th}$ video frame of the video. In general, the subset of video frames may include multiple video frames, excluding all video frames in the video.

According to still other embodiments described herein, a signature of a video may be based on color schemes of sections of each video frame of the video, or select video frames of that video. That is, the image features may be color schemes, and the signature may be generated using color schemes from one or more sections of each video frame of the video. For example, each video frame may be divided into one or more tiles or blocks, and the color schemes of a subset of the tiles may be used to generate the signature. The subset of tiles may be every tile, even numbered tiles, odd numbered tiles, every $N^{th}$ tile, a suitable pattern of the tiles, or any other suitable number of tiles of a video frame. In some embodiments, each video frame may be divided into an arbitrary number of tiles. Additionally or alternatively, each tile may be of the same size as the other tiles in a video frame. According to some embodiments, each video frame may be divided into logical tiles, such as tiles corresponding to top, bottom, left, right, and center portions of a video frame. As will be appreciated, other logical divisions are envisioned and, in some embodiments, may be based on factors such as the type of video (e.g., action, scenic, documentary, movie, educational, commercial, teaching aid, other genres, etc.) or other suitable factors. In some such embodiments, the logical tiles may be of the same size or, alternatively, different sizes.

Similar to the signature generation based on pixel values described previously, according to an embodiment of the present disclosure, color schemes from select frames of a video may be used in generating a signature of the video. Similarly, the portion of the video may be a sequence of video frames, such as every $2^{nd}$, $3^{rd}$, or $n^{th}$ video frame, of the video.

In any such cases, once a video signature of a video is generated and compared with video signatures of reference videos (e.g., known videos) to determine whether there is a match between video signatures.

Although comparing video signatures may be sufficient for matching untampered or otherwise unedited videos, comparing video signatures may not be sufficient in instances where a video has been altered or otherwise tampered. For example, in instances where only a small clip or portion of a video is available, the frame numbers may not be aligned, thus inhibiting video signature based matching. In other instances, the luminosity of a video may have been altered, causing a change in pixel values of each video frame of the video, thus inhibiting video signature based matching. In a more general sense, comparing video signatures may not be suitable to determine matching videos in instances where only a small portion of the video may available for comparison, when the frame numbers may not be in sync, minor adjustments have been made to some of the pixels, a portion of the video has been changed, or the video is otherwise modified or tampered with in any other manner.

Thus, according to some further embodiments described herein, rather than comparing video signatures, a curve for a video can be derived based on the image features used to generate a video signature of the video, and the derived curve can be compared with curves corresponding to reference videos to determine whether there is a match between the video and a reference video. In such embodiments, a curve for a video can be derived by applying a mathematical function, such as a hash function, to the image features of each video frame to generate respective hash values for the videos frames of the video, and plotting the generated values over a suitable period of time (e.g., over a suitable number of video frames). So, if the same hash function is applied to both a given reference video and a modified version of that reference video, the resulting plots may be offset from one another, but comparison will still show sufficient similarity so as to allow for video signature based matching. These and other advantages and alternative embodiments will be apparent in light of this disclosure.

As used herein, the term "color scheme" refers, in addition to its plain and ordinary meaning, to a characterization of a choice of colors used in media. For example, the choice of colors may be one or more predominant colors, where a predominant color may, for instance, be a color that is most common. In the context of a video frame, a color scheme may be a suitable number of predominant colors in the video frame. In the context of a tile of a video frame, a color scheme may be a suitable number of the most common colors in the tile of the video frame. In one example, a color scheme of a video frame or a tile of a video frame may be characterized by determining the color of each pixel in the video frame or the tile of the video frame, and selecting the most common N colors, such as two, three, four, five, etc., that are present in the video frame or the tile of the video frame. The aforementioned example of a color scheme is only one suitable example, and other suitable characterizations of a color scheme are envisioned, as will be appreciated in light of this disclosure.

Turning now to the figures, FIG. 1 illustrates an example signature matching process workflow 100, in accordance with an embodiment of the present disclosure. A signature (106) of a video (102) is generated (104). In an example scenario, a user may start the playing of the video (102) on a video playback device. Prior to starting the playing of the video (102), the signature (106) of the video (102) can be generated (104), matched (108) against a database of signatures of reference videos, and an appropriate action can be taken based on the results of the match (110). For example, assuming that the reference videos are of known pirated or otherwise illegal videos, the appropriate action may be to prohibit the playing of the video if the match is successful.

In an example use case and embodiment, a signature of a video can be generated and matched prior to downloading or copying of the video. For example, a user may request to download (or copy) a video onto a video playback device from a remote device, such as a server. To ensure that the downloading of the video is authorized, the remote device can generate a signature of the video and match the signature against the database of signatures of reference videos. In a general sense, a signature of a video can be generated for video recognition applications, video classification applications, video validation applications, and analytics applications, such as antipiracy analytics and universal analytics, to name a few examples. Other suitable use cases are envisioned and will be apparent to one of skill in the art in light of this disclosure.

In some use cases, video signature matching process workflow 100 can be augmented by generating a checksum of a signature, and using the checksum as an index in the database of known signatures. In this approach, instead of searching the database of known signatures for the generated signature, which may require a search of the entire database, the generated checksum is first used as an index into the database and the signature is used to search the indexed portion of the database. Accordingly, although searches using signatures generated using the disclosed techniques provide fast and efficient searches, augmenting these searches by first using the checksums as indexes provide even faster and more efficient searches.

Figure 2:
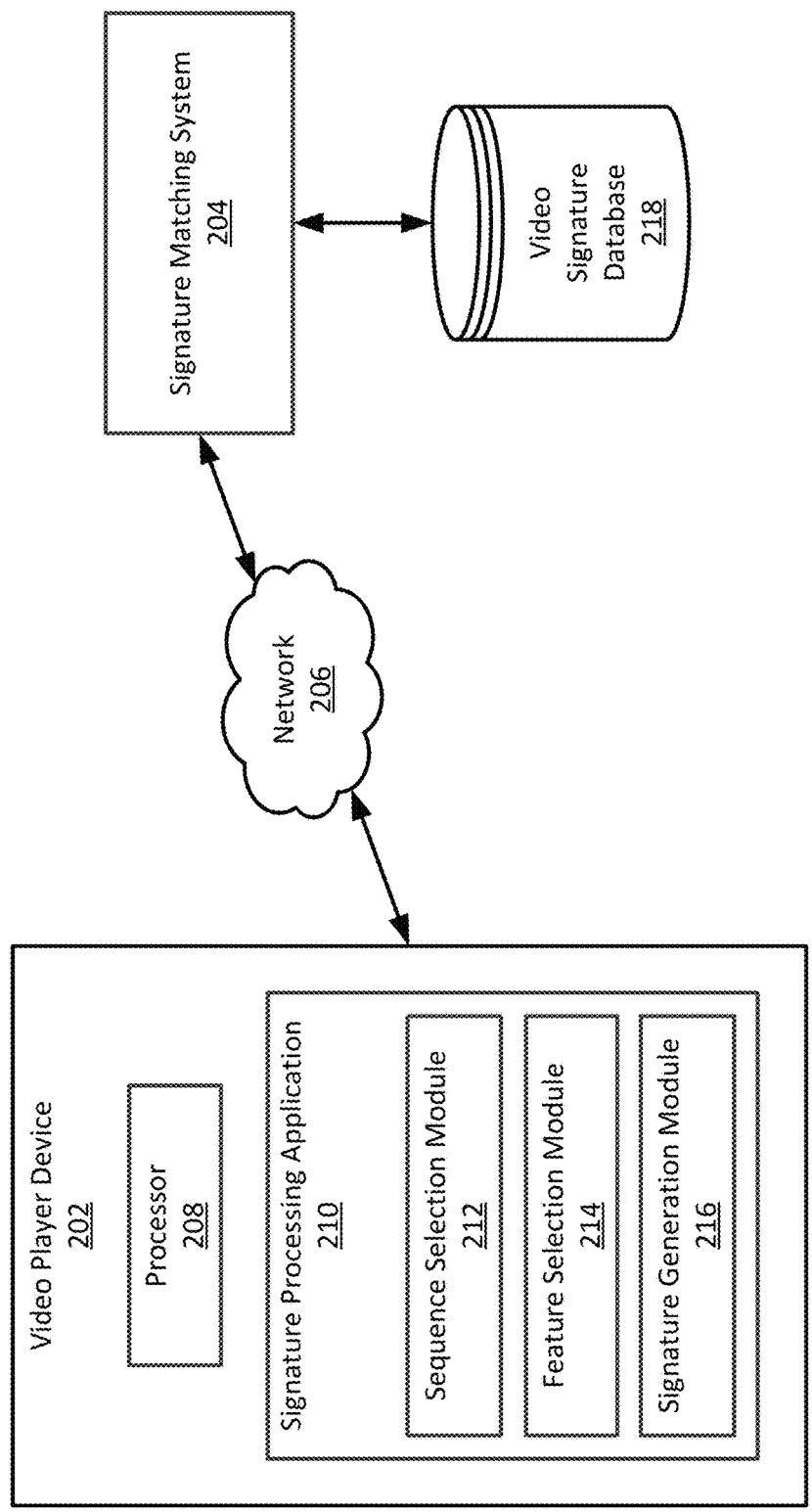
FIG. 2 illustrates an example system for video signature matching, in accordance with an embodiment of the present disclosure.

FIG. 2 illustrates an example system 200 for video signature matching, in accordance with an embodiment of the present disclosure. System 200 includes a video player device 202 communicatively coupled to a signature matching system 204 via a network 206. Network 206 can be a local area network, a wide area network, the Internet, and/or other wired or wireless networks. Video player device 202 may be any computing device or other device suitable for providing playing of videos, including the control of the playing of videos, such as set top boxes, digital video recorders, smart televisions, computers, laptops, tablets, mobile devices, smart phones, and any other suitable machines for the playback of videos.

As depicted, video player device 202 includes a processor 208 and a signature processing application 210, which further includes a sequence selection module 212, a feature selection module 214, and a signature generation module 216. Video player device 202 is configured to execute signature processing application 210. In various embodiments, additional components (not illustrated, such as a display, user input device, communication interface, etc.) or a subset of the illustrated components can be employed without deviating from the scope of the present disclosure. For instance, other embodiments may integrate the various functionalities of modules 212, 214, and 216 into fewer modules (e.g., one or two) or more modules (e.g., four or five, or more). In addition, further note that the various components of video player device 202 may all be in a stand-alone computing system according to some embodiments, while in others, may be distributed across multiple machines. For example, according to an embodiment, signature processing application 210 or various functionalities of modules 212, 214, and 216 may be integrated into and/or otherwise provided as part of signature matching system 204. In a more general sense, the degree of integration and distribution of the functional component(s) provided herein can vary greatly from one embodiment to the next, as will be appreciated in light of this disclosure.

Signature processing application 210 is configured to generally provide the overall control of the generation and processing of video signatures utilizing the services and functionality of modules 212, 214, and 216 as necessary. In particular, according to some embodiments, signature processing application 210 initiates the generation of a signature of a video, for example, prior to use or accessing of the video, such as the playing of the video, copying of the video, downloading of the video, or as otherwise necessary. In some such embodiments, signature processing application 210 may request matching of a generated signature by signature matching system 204, and may take an appropriate action based on the result of the match. Such actions may include, for instance, recording the identification of the video, providing a notification of use or access of the video to, for example, an analytics system, an automatic classification system, a validation system, or other system requiring such notice (e.g., video clearing house), displaying a message, such as an error message, disabling or otherwise prohibiting the use of the video, and allowing the use of or other operation on the video, to name a few examples.

Sequence selection module 212 is configured to specify a video frame sequence of a video from which to derive the image features, which are to be used in generating a video signature. In an example embodiment, the video frame sequence may include the entire video (e.g., all the video frames of the video). In this instance, the image features for use in generating the video signature are obtained from each video frame of the video. In other embodiments, the video frame sequence may be a sequence of a subset of the video frames, such as every $n^{th}$ video frame, of the video. For example, assuming the sequence specifies every $3^{rd}$ video frame, the video frame sequence includes every $3^{rd}$ video frame (e.g., frame #3, frame #6, frame #9, and so on) of the video. In this instance, the image features for use in generating the video signature are obtained from every $3^{rd}$ video frame of the video. In some embodiments, the video frame sequence may include a continuous segment of the video (e.g., a video clip of the video). In such embodiments, the video clip can be from any portion of the video, such as the beginning of the video, the middle of the video, the end of the video, or any other suitable portion of the video. In an example implementation, the length of the video clip may depend on the contents of the video. For example, a video clip of a relatively short length or duration, such as a few seconds, may be sufficient for a video whose contents have a high degree or level of variance (e.g., content that changes from frame to frame). Conversely, a video clip of a longer length or duration may be necessary for a video whose contents have a lower degree or level of variance, such as a video of a talk show as one example. In some embodiments, the video frame sequence may include the key frames of a video. For example, the key frames of the video may be video frames at the end of one scene and the beginning of a new scene where the image content changes or is expected to change rapidly. In some cases, the key frames of a video may be selected from distinguishable (e.g., unique) and, in some instances, very distinguishable sections of the video, or pivotal locations or portions of the video, such as a last conflict scene of an action video, to name two examples. Other suitable video frame sequences are envisioned and will be apparent in light of this disclosure. In any such cases, the image features are obtained from the video frames in the specified video frame sequence.

Feature selection module 214 is configured to specify the image features of a video that are to be used in generating a video signature. In an example embodiment, the image features may be pixel values from a suitable subset or collection of pixels in a video frame. In the case of a grayscale image, the pixel values may describe the grayscale intensity values, and in the case of a color image, the pixel values may describe the Red-Green-Blue (RGB) or other color intensity values. To this end, a reasonable presumption being made by feature selection module 214 is that, if selected carefully, a small number of pixels of a video frame may be suitable for generating a unique signature of a video of a suitable length. In such embodiments, feature selection module 214 can specify the pixels in the video frame from which to obtain the image features.

Figure 3:
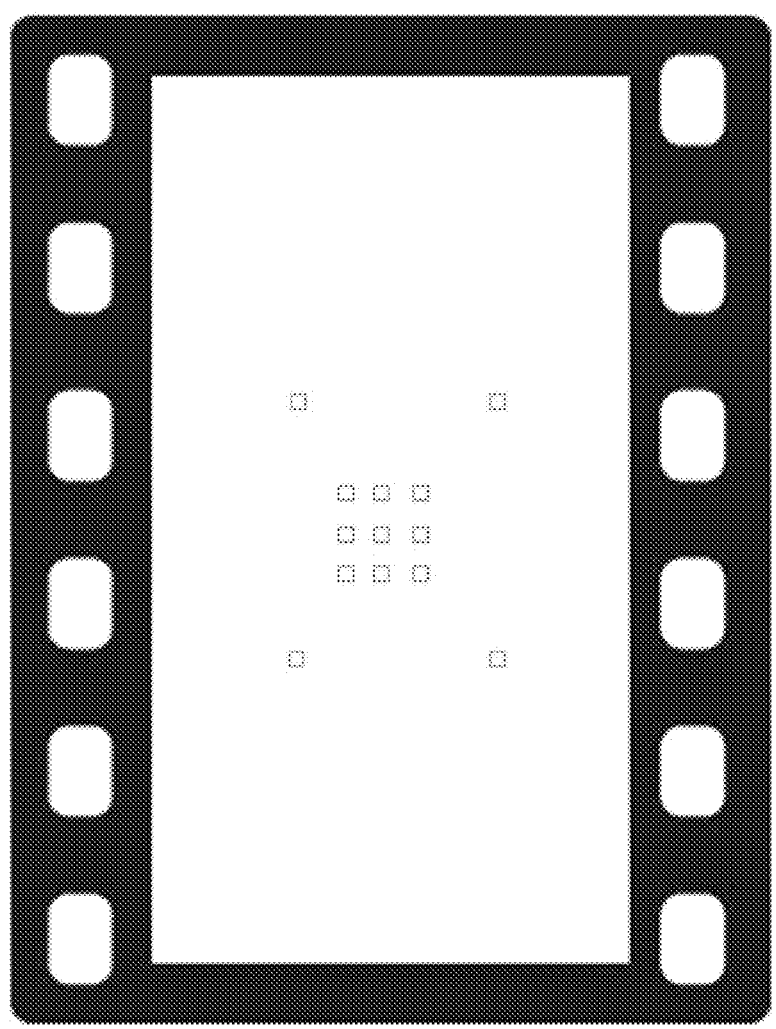
FIG. 3 is a diagram illustrating an example video frame showing a collection of pixels from which to obtain the pixel values for a signature, in accordance with an embodiment of the present disclosure.

In some embodiments, a collection of pixels whose pixel values are expected to change from one frame to the next are selected from which to obtain the image features. For example, contents near the center of an image may be expected to change frequently on a frame by frame basis based on a presumption that the action in a video is likely to be near the center of the images. Accordingly, a suitable subset or collection of pixels at or near the center of a video frame may be selected from which to obtain the image features. FIG. 3 is a diagram illustrating an example video frame showing a collection of pixels from which to obtain the pixel values for a signature, in accordance with an embodiment of the present disclosure. As illustrated in FIG. 3, the collection of pixels includes 13 pixels as represented by the 13 small boxes dispersed near or about the center of the video frame. Note that the collection of pixels may include a different number of pixels than that shown in FIG. 3. Also note that, although possible, the pixels in the collection of pixels need not be in a continuous or connected arrangement. Moreover, the pixels in the collection of pixels need not be at or near the center of the video frame. For example, as can be seen in FIG. 3, pixels that are not in the collection of pixels may be nearer to the center of the video frame than some of the pixels in the collection of pixels.

In other embodiments, a collection of pixels in a region of a video frame having a relatively higher expected frame to frame color variance is selected from which to obtain the image features. In such embodiments, a first region of a video frame having a relatively higher expected frame to frame color variance as compared to a second region of the video frame is selected, and a suitable subset or collection of pixels from which to obtain the image features may be selected from the first region.

In some embodiments, the number of pixels that are selected may be based on factors such as the length of the video, the length of the video frame sequence, for example, as specified by sequence selection module 212, and the locations of the specified pixels in the video frame, to name three examples. For example, if a majority of the pixels in the selected collection of pixels are near the edge or border of the video frame, the selected collection of pixels may include a relatively larger number of pixels. Alternatively, if a majority of the pixels in the selected collection of pixels are near the center of the video frame and not the edges of the video frame, the selected collection of pixels may include a relatively smaller number of pixels. In any case, one or more of such factors may be used to determine a suitable number, N, of pixels in a video frame whose pixels values are to be used in generating the video signature. In such cases, N may be from one pixel to a multiple number of pixels in the video frame, excluding all pixels of the video frame. Note that selecting a smaller number of pixels allows for faster computation of video signatures and matching of video signatures. However, using a very small number of pixels may increase the chance of collision (e.g., generating non-unique video signatures). Hence, as will be appreciated, there is a tradeoff between computational efficiency and the risk of collisions.

In some embodiments, the image features may be color schemes of a section or sections of a video frame on a per video frame basis. In some such embodiments, a video frame may be divided into one or more tiles, and the color schemes from one or more tiles can be used in generating a video signature. In such embodiments, feature selection module 214 can provide information regarding the division of the video frame into tiles, and specify the tiles in the video frame from which to obtain the image features.

Figure 4:
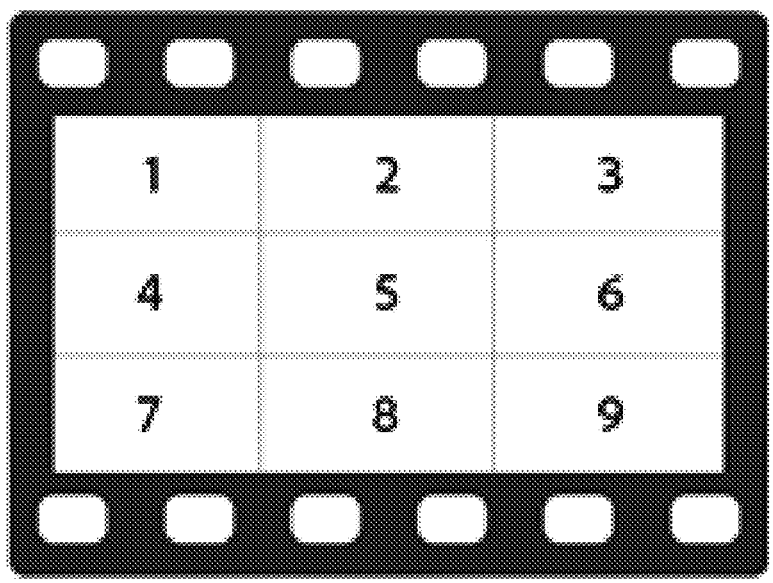
FIG. 4 is a diagram illustrating an example video frame divided into nine equally sized tiles, in accordance with an embodiment of the present disclosure.

In some embodiments, feature selection module 214 is configured to divide a video frame into a number of tiles. As will be appreciated, a video frame can be divided into any suitable number of tiles. Moreover, in some instances, some of the tiles may be of the same size. FIG. 4 is a diagram illustrating an example video frame divided into nine equally sized tiles, in accordance with an embodiment of the present disclosure. Feature selection module 214 can, in such embodiments, specify any one or more of the nine tiles as the tiles from which to obtain the image features. For instance, feature selection module 214 can specify the even numbered tiles, tile #2, tile #4, tile #6, and tile #8, as the tiles from which to obtain the color schemes. Alternatively, feature selection module 214 can specify the odd numbered tiles, tile #1, tile #3, tile #5, tile #7, and tile #9, as the tiles from which to obtain the color schemes. In a more general sense, feature selection module 214 can specify any number of the tiles, including any pattern of the tiles, as the tiles from which to obtain the color schemes.

Figure 5:
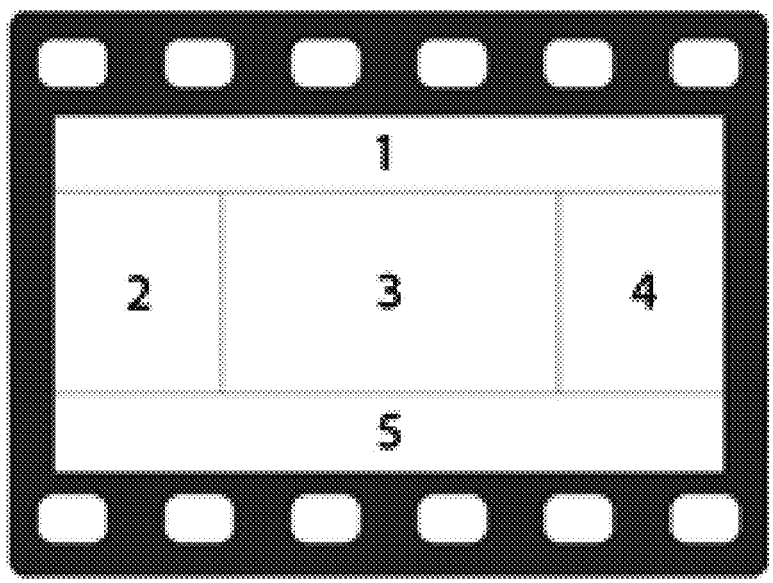
FIG. 5 is a diagram illustrating an example video frame divided into five logical tiles, in accordance with an embodiment of the present disclosure.

In other embodiments, a video frame may be divided into a suitable number of logical tiles. FIG. 5 is a diagram illustrating an example video frame divided into five logical tiles, in accordance with an embodiment of the present disclosure. Various attributes of the logical tiles, such as the number, the size, and the shape to name a few examples, may be based on the positioning or arrangement of the logical tiles within the video frame. As illustrated in FIG. 5, tile #1 generally covers the top region of the video frame, tile

2 generally covers the middle-left region of the video frame, tile #3 generally covers the middle-center region of the video frame, tile #4 generally covers the middle-right region of the video frame, and tile #5 generally covers the bottom region of the video frame. Feature selection module 214 can, in such embodiments, specify any one or more of the five logical tiles as the tiles from which to obtain the image features. For instance, feature selection module 214 can specify the logical tiles generally covering the horizontal middle of the video frame, for example, tile #2, tile #3, and tile #4, as the tiles from which to obtain the color schemes. Alternatively, feature selection module 214 can specify the logical tiles generally covering the middle of the video frame, for example, tile #3, as the tile from which to obtain the color schemes. In a more general sense, feature selection module 214 can specify any number of the logical tiles, including any pattern of the logical tiles, as the tiles from which to obtain the color schemes. Note that a video frame may be divided into a different number of logical tiles than that shown in FIG. 5. Also note that, although possible, the logical tiles need not be of the same size (e.g., same number of pixels). Moreover, the logical tiles need not be of rectangular shape, but may be of different and varying shapes.

Signature generation module 216 is configured to generate a signature of a video using the video frame sequence specified by sequence selection module 212 and the image features specified by feature selection module 214. In embodiments where pixel values are specified as the image features, signature generation module 216 can determine the pixel values of the pixels specified by feature selection module 214 over the sequence of video frames specified by sequence selection module 212, and use the sequence or other appropriate combination of the pixel values as the video signature. In an example case where pixel value is specified as the image feature, four pixels, for example, as illustrated in the example video frame of FIG. 4, are specified as the pixels from which to obtain the pixel values, and video frames 1 to M of a video are specified as the video frame sequence, the video signature may be expressed as:

$$
\begin{aligned}
&\text{Pixel\_vals[frame\_1]} = \\
&\quad [\text{color\_of\_p1, color\_of\_p2, color\_of\_p3, color\_of\_p4}], \\
&\text{Pixel\_vals[frame\_2]} = \\
&\quad [\text{color\_of\_p1, color\_of\_p2, color\_of\_p3, color\_of\_p4}], \\
&\ldots \\
&\text{Pixel\_vals[frame\_M-1]} = \\
&\quad [\text{color\_of\_p1, color\_of\_p2, color\_of\_p3, color\_of\_p4}], \\
&\text{Pixel\_vals[frame\_M]} = \\
&\quad [\text{color\_of\_p1, color\_of\_p2, color\_of\_p3, color\_of\_p4}]
\end{aligned} \quad (1)
$$

where color_of_pn is the pixel value of pixel n, which may either be a grayscale intensity value or a color intensity value, as described previously. In such cases, data structure (1) becomes a unique signature of each video. For example, data structure (1) having specific example pixel values may be expressed as:

$$
\begin{aligned}
&[ \\
&\quad 1: [\#aaaaaa, \#121212, \#ad398a, \#bca901], \\
&\quad 2: [\#374834, \#449a33, \#bb99ba, \#000000], \\
&\quad \ldots \\
&\quad M-1: [\#aaaaaa, \#206954, \#44d2aa, \#a27406], \\
&\quad M: [\#696dbd, \#ff00ff, \#ee82ee, \#e9be56] \\
&]
\end{aligned} \quad (2)
$$

Figure 6:
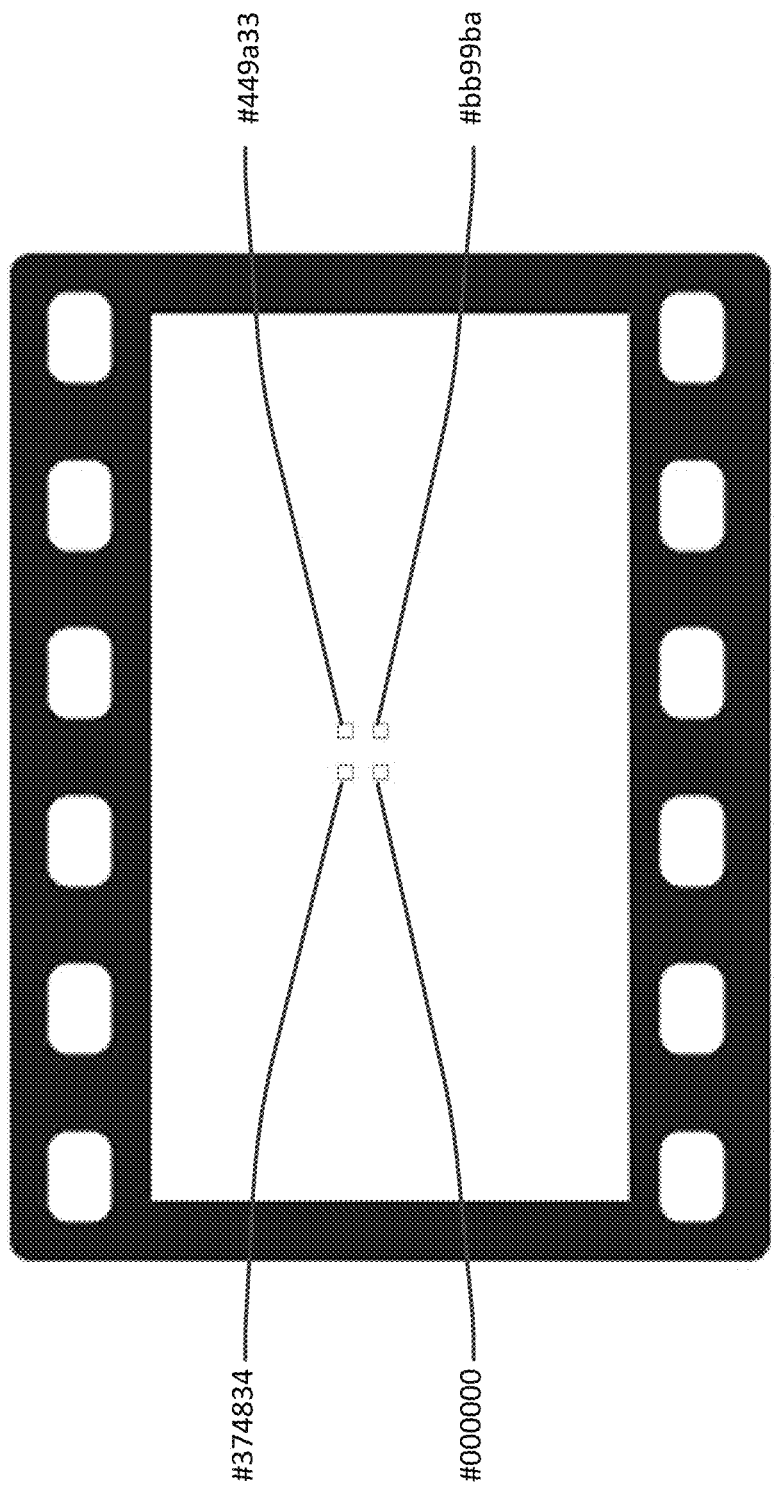
FIG. 6 is a diagram illustrating an example video frame showing four pixels having respective pixel values, in accordance with an embodiment of the present disclosure.

Data structure (2), for example, is a concatenation of the pixel values of the video frames, and may be a signature of a video. FIG. 6 is a diagram illustrating an example video frame showing four pixels having respective pixel values, in accordance with an embodiment of the present disclosure. Specifically, the video frame shown in FIG. 6 may be the second frame of the video identified by the signature of data structure (2). As shown in FIG. 6, pixel #1 is determined to have pixel value #374834, pixel #2 is determined to have the pixel value #449a33, pixel #3 is determined to have the pixel value #bb99ba, and pixel #4 is determined to have the pixel value #000000. In the general case where X pixels are specified, and video frames 1 to Y of a video are specified as the video frame sequence, the video signature may be expressed as:

$$
\begin{aligned}
&\text{Pixel\_vals[frame\_1]} = [\text{color\_of\_p1, color\_of\_p2, \ldots,} \\
&\quad \text{color\_of\_pX}], \\
&\text{Pixel\_vals[frame\_2]} = [\text{color\_of\_p1, color\_of\_p2, \ldots,} \\
&\quad \text{color\_of\_pX}], \\
&\ldots \\
&\text{Pixel\_vals[frame\_Y-1]} = [\text{color\_of\_p1, color\_of\_p2, \ldots,} \\
&\quad \text{color\_of\_pX}], \\
&\text{Pixel\_vals[frame\_Y]} = [\text{color\_of\_p1, color\_of\_p2, \ldots,} \\
&\quad \text{color\_of\_pX}]
\end{aligned} \quad (3)
$$

In embodiments where color schemes are specified as the image features, signature generation module 216 can determine the color schemes of the tiles specified by feature selection module 214 over the sequence of video frames specified by sequence selection module 212, and use the sequence or other appropriate combination of the color schemes as the video signature. In an example implementation, a color scheme may be the n, such as two, three, four, or any other suitable number, predominant colors in a tile. In another example implementation, a color scheme may be the n, such as two, three, four, or any other suitable number, predominant colors in a tile subsequent to filtering out certain colors, such as black, gray, and brown, to name three examples. In such implementations, the color scheme may be expressed as a filter value (e.g., color(s) that are filtered out) and the number of predominant colors other than the filtered colors. Examples of other suitable color schemes include a select number of the brightest colors, and a select number of colors nearest the center of a frame, to name two examples. In some embodiments, signature generation module 216 can determine the predominant colors using local averages of the color indicated by the pixels. For example, lighting effects may cause a black couch in an image to appear as 1,000s of slightly different shades of black. In this instance, a color scheme of X nearly identical colors may not be useful. In such instances, signature generation module 216 can use ranges or averages of the colors indicated by the pixels depicting the couch in the image to classify the entire couch as a single color.

Figure 7:
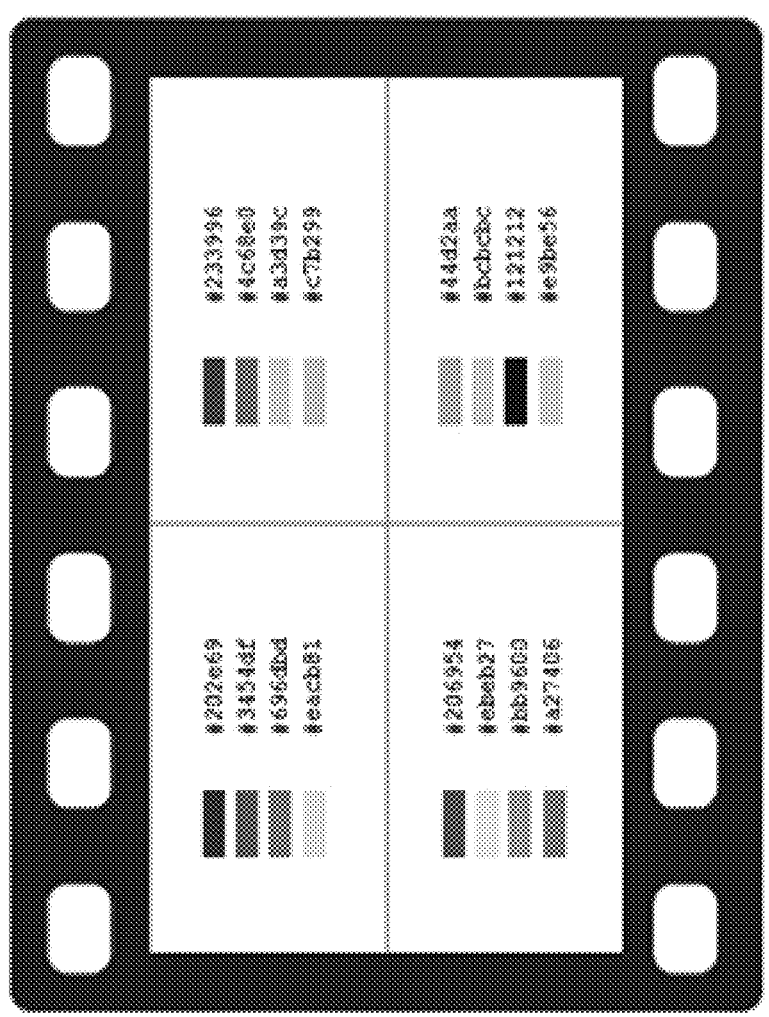
FIG. 7 is a diagram illustrating an example video frame divided into four tiles having respective color schemes, in accordance with an embodiment of the present disclosure.

In an example case where color scheme is specified as the image feature, tile #1, tile #2, tile #3, and tile #4 of four tiles, for example, as illustrated in the example video frame of FIG. 7, are specified as the tiles from which to obtain the color schemes, four predominant colors in each tile are specified as the color scheme, and video frames 1 to N of a video are specified as the video frame sequence, the video signature may be expressed as:

$$
\begin{aligned}
&\text{Color\_schemes[frame\_1]} = \\
&\quad [\text{color1\_of\_t1, color2\_of\_t1, color3\_of\_t1, color4\_of\_t1}], \\
&\quad [\text{color1\_of\_t2, color2\_of\_t2, color3\_of\_t2, color4\_of\_t2}], \\
&\quad [\text{color1\_of\_t3, color2\_of\_t3, color3\_of\_t3, color4\_of\_t3}],
\end{aligned}
$$

-continued

```
    [color1_of_t4, color2_of_t4, color3_of_t4, color4_of_t4],
Color_schemes[frame_2] =
    [color1_of_t1, color2_of_t1, color3_of_t1, color4_of_t1],
    [color1_of_t2, color2_of_t2, color3_of_t2, color4_of_t2],
    [color1_of_t3, color2_of_t3, color3_of_t3, color4_of_t3],     (4)
    [color1_of_t4, color2_of_t4, color3_of_t4, color4_of_t4],
...
Color_schemes[frame_N] =
    [color1_of_t1, color2_of_t1, color3_of_t1, color4_of_t1],
    [color1_of_t2, color2_of_t2, color3_of_t2, color4_of_t2],
    [color1_of_t3, color2_of_t3, color3_of_t3, color4_of_t3],
    [color1_of_t4, color2_of_t4, color3_of_t4, color4_of_t4]
``` where color1_of_tq is the $1^{st}$ predominant color of tile q, color2_of_tq is the $2^{nd}$ predominant color of tile q, color3_of_tq is the $3^{rd}$ predominant color of tile q, and color4_of_tq is the $4^{th}$ predominant color of tile q. In such cases, data structure (4) becomes a unique signature of each video. For example, data structure (4) having specific example color schemes may be expressed as:

```
[
1: [
    [#202e69, #3454df, #696dbd, #eacb81],
    [#233996, #4c68e0, #a3d39c, #c7b299],
    [#206954, #ebeb27, #bb9600, #a27406],
    [#44d2aa, #bcbcbc, #121212, #e9be56]
],
2: [
    [          ...          ],
    [          ...          ],
    [          ...          ],                                   (5)
    [          ...          ]
],
...
N: [
    [          ...          ],
    [          ...          ],
    [          ...          ],
    [          ...          ]
]
]
```

Data structure (5), for example, may be a signature of a video. FIG. 7 is a diagram illustrating an example video frame divided into four tiles having respective color schemes, in accordance with an embodiment of the present disclosure. Specifically, the video frame shown in FIG. 7 may be the first frame of the video identified by the signature of data structure (5). As shown in FIG. 7, tile #1 is the tile located at the upper-left quadrant of the video frame, tile #2 is the tile located at the upper-right quadrant of the video frame, tile #3 is the tile located at the lower-left quadrant of the video frame, and tile #4 is the tile located at the lower-right quadrant of the video frame. As further shown in FIG. 7, tile #1 is determined to have the color scheme as represented by hex color codes #202e69, #3454df, #696dbd, and #eacb81, tile #2 is determined to have the color scheme as represented by hex color codes #233996, #4c68e0, #a3d39c, and #c7b299, tile #3 is determined to have the color scheme as represented by hex color codes #206954, #ebeb27, #bb9600, and #a27406, and tile #4 is determined to have the color scheme as represented by hex color codes #44d2aa, #bcbcbc, #121212, and #e9be56.

Signature matching system 204 is configured to search video storage database 218 for a provided video signature. In an example scenario, signature processing application 210 may provide signature matching system 204 a video signature, and request signature matching system 204 to determine whether the provided video signature matches a video signature of a reference video in video storage database 218. In response, signature matching system 204 searches video storage database 218 for a video signature matching the provided video signature, and returns the result of the search (e.g., match successful or match unsuccessful).

In some embodiments, signature matching system 204 is configured to generate a checksum, or other suitable small-size item of data, of a provided video signature, and use the checksum as an index into video storage database 218. For instance, signature matching system 204 can use the generated checksum to perform an index search of video storage database 218 for the provided video signature.

Matching video signatures may not be sufficient in certain instances, such as where only a small portion of the video may have been available to generate the video signature, when the frame numbers of the video frames used to generate the video signature may have been altered or tampered with (e.g., frame numbers are not in sync), minor adjustments have been made to some of the pixels in the video frames used to generate the video signature, a portion of the video used to generate the video signature has been changed, or the video used to generate the video signature is tampered with in any other manner. Instead, according to some embodiments described herein, signature matching system 204 is configured to derive a curve for a video based on the image features used to generate a video signature of the video, and compare the derived curve with curves corresponding to reference videos in video storage database 218 to determine a match between curves. Signature processing application 210 may, for example, provide signature matching system 204 a video signature, and request signature matching system 204 to determine whether the provided video signature matches a video in video storage database 218. Instead of comparing video signatures, signature matching system 104 can determine the image features for each video frame from the video signature, and apply a suitable hash function to the image features of each video frame to generate a resulting value (e.g., hash value) for each video frame. Signature matching system 104 can then plot the generated hash values over a suitable period of time (e.g., for a suitable number of video frames), and compare the resulting curve (e.g., plot of the hash values) with similarly generated curves corresponding to reference videos to determine whether there is a match between curves. According to some embodiments, the suitable hash function is a hash function that, for two video frames with similar image features, generates hash values that are also similar. Accordingly, if minor adjustments are made to the pixels in a video frame, the generated hash value based on the adjusted pixels would be similar to a hash value generated based on the original pixels. In addition, the offset between the hash value generated based on the original pixels and the hash value generated based on the adjusted hash values would be generally constant from video frame to video frame.

In an example implementation, the suitable hash function may be a mathematical function or operation performed on the image features of a video frame. For example, in the case where the image features are pixel values, a suitable hash function may be a mathematical operation, such as addition, multiplication, or any other suitable operation or combination of operations, performed on the pixel values of the video frame. For example, in the case of the example video frame and pixel values illustrated in FIG. 6, a hash value for the video frame may be generated by summing the pixel values #374834, #449a33, #bb99ba, and #000000. In the case where the image features are color schemes, a suitable hash function may be a mathematical operation or combination of operations performed on the values (e.g., R values, G values, and B values) representing the color schemes of the video frame. For example, in the case of the example video frame and color schemes illustrated in FIG. 7, a hash value for the video frame may be generated by performing an operation or combination of operations the color scheme values #202e69, #3454df, #696dbd, #eacb81, #233996, #4c68e0, #a3d39c, #c7b299, #206954, #ebeb27, #bb9600, #a27406, 44d2aa, #bcbcbc, #121212, and #e9be56.

Figure 8:
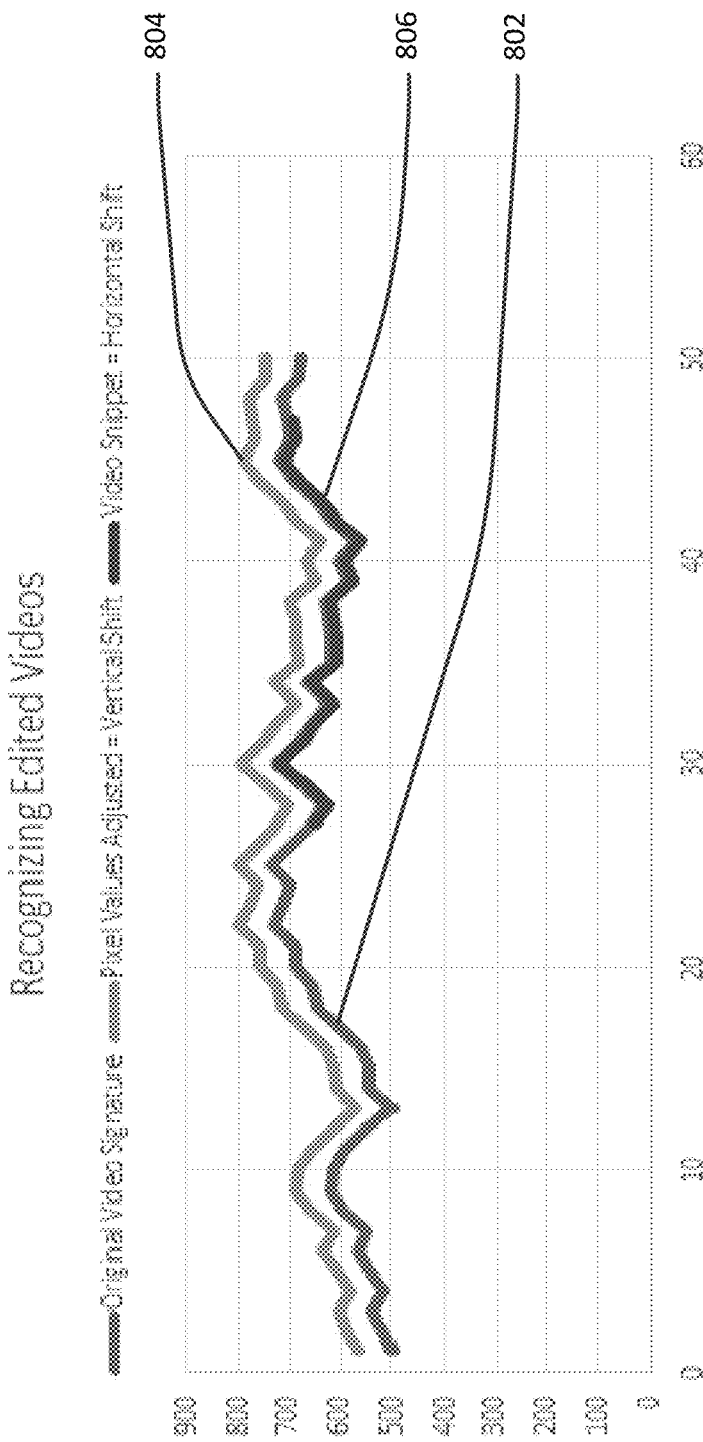
FIG. 8 illustrates an example plot of derived curves corresponding to respective videos, in accordance with an embodiment of the present disclosure.

In such embodiments, a tampering of a video, such as by altering the pixels in some or all of the video frame of the video, may be indicated by a vertical shift in a curve derived for the video. As shown in FIG. 8, a curve 802 may be a plot of a curve derived for an untampered video, and a curve 804 may be a plot of a curve derived for a tampered version of this video. Specifically, in this case, the tampered version of the video may have been generated by making minor adjustments to each pixel of the video, and tampering of the video may be indicated by the illustrated vertical shift between curve 802 (derived curve for the untampered video) and curve 804 (derived curve for the tampered version of the video). Moreover, in cases where the frame numbers are altered or changed, such as when only a portion of a video is available with which to generate a video signature, this tampering of the frame numbers may be indicated by a horizontal shift in a curve derived for the video. The horizontal shift is further shown in FIG. 8 by a curve 806, which may be a plot of a curve derived for a portion of the untampered video corresponding to curve 802. Specifically, in this case, the change in the frame numbers is indicated by the illustrated horizontal shift between curve 802 and curve 806. In general, the respective videos corresponding to curve 802 and curve 804 can be determined to be the same video. Similarly, the respective videos corresponding to curve 802 and curve 806 can be determined to be the same video.

Figure 9:
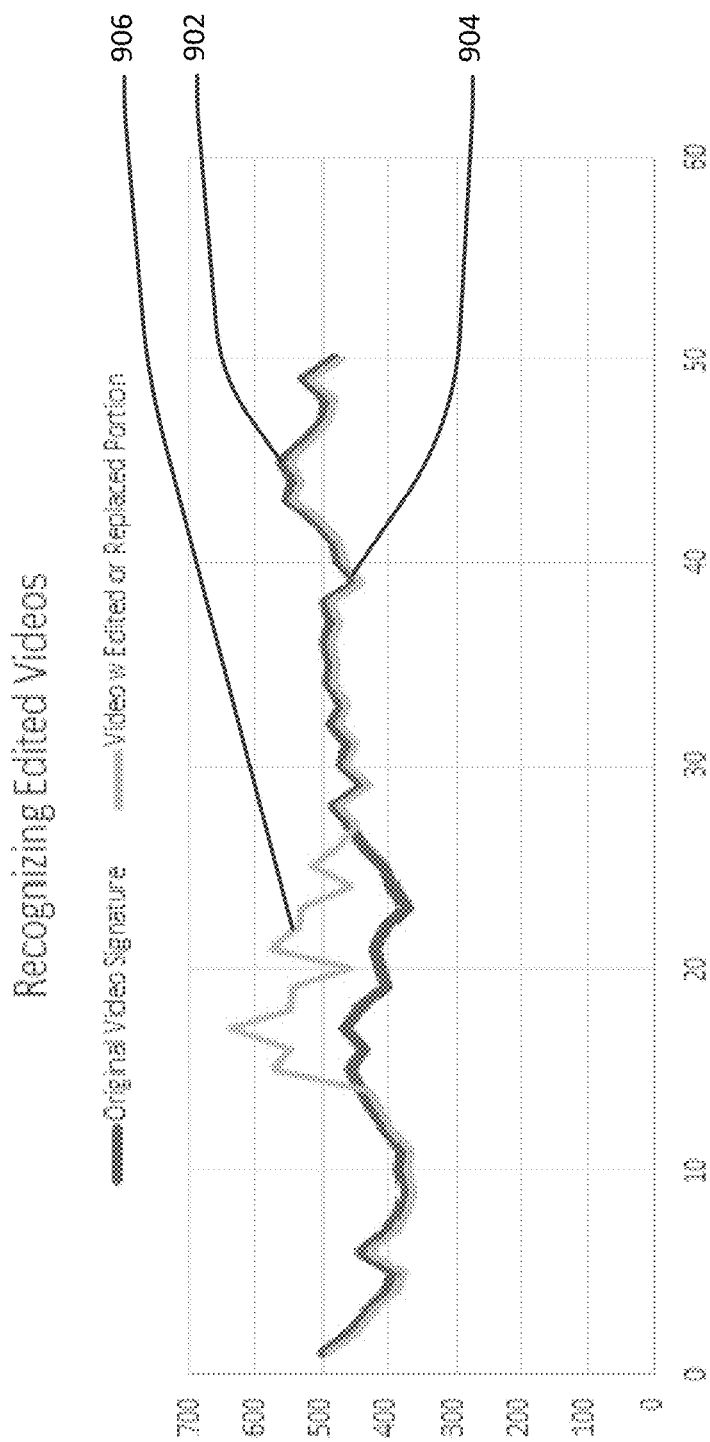
FIG. 9 illustrates another example plot of derived curves corresponding to respective videos, in accordance with an embodiment of the present disclosure.

Further in such embodiments, a tampering of a video by editing the video to completely change certain video frames, such as adding objects to or removing objects from the video frames, for example, by photoshopping, or completely replacing the video frames, may be indicated by portions of two derived curves (one curve derived for the untampered video, and another curve derived for the tampered version of the video) that are identical. As shown in FIG. 9, a curve 902 may be a plot of a curve derived for an untampered video, and a curve 904 may be a plot of a curve derived for a tampered version of this video. As can be seen in FIG. 9, the majority of curve 904 may be identical to curve 902, except for a portion 906 of curve 904. Specifically, in this case, portion 906 of curve 904 corresponds to the portion of the video (e.g., video frames of the video) that may have been completely changed. In general, the respective videos corresponding to curve 902 and curve 904 can be determined to be the same video.

In some embodiments, video storage database 218 is implemented on a back-end server that is remote from signature matching system 204 and in communication with signature matching system 204 over a network, such as the Internet or an intranet. Video storage database 218 may include any suitable digital storage device configured to store digitally encoded data. In some embodiments, the data stored on video signature database 218 includes videos from known sources and, in some instances, video signatures of the reference videos. For example, a video clearing house may maintain a database of reference videos and/or signatures of the reference videos.

Figure 10:
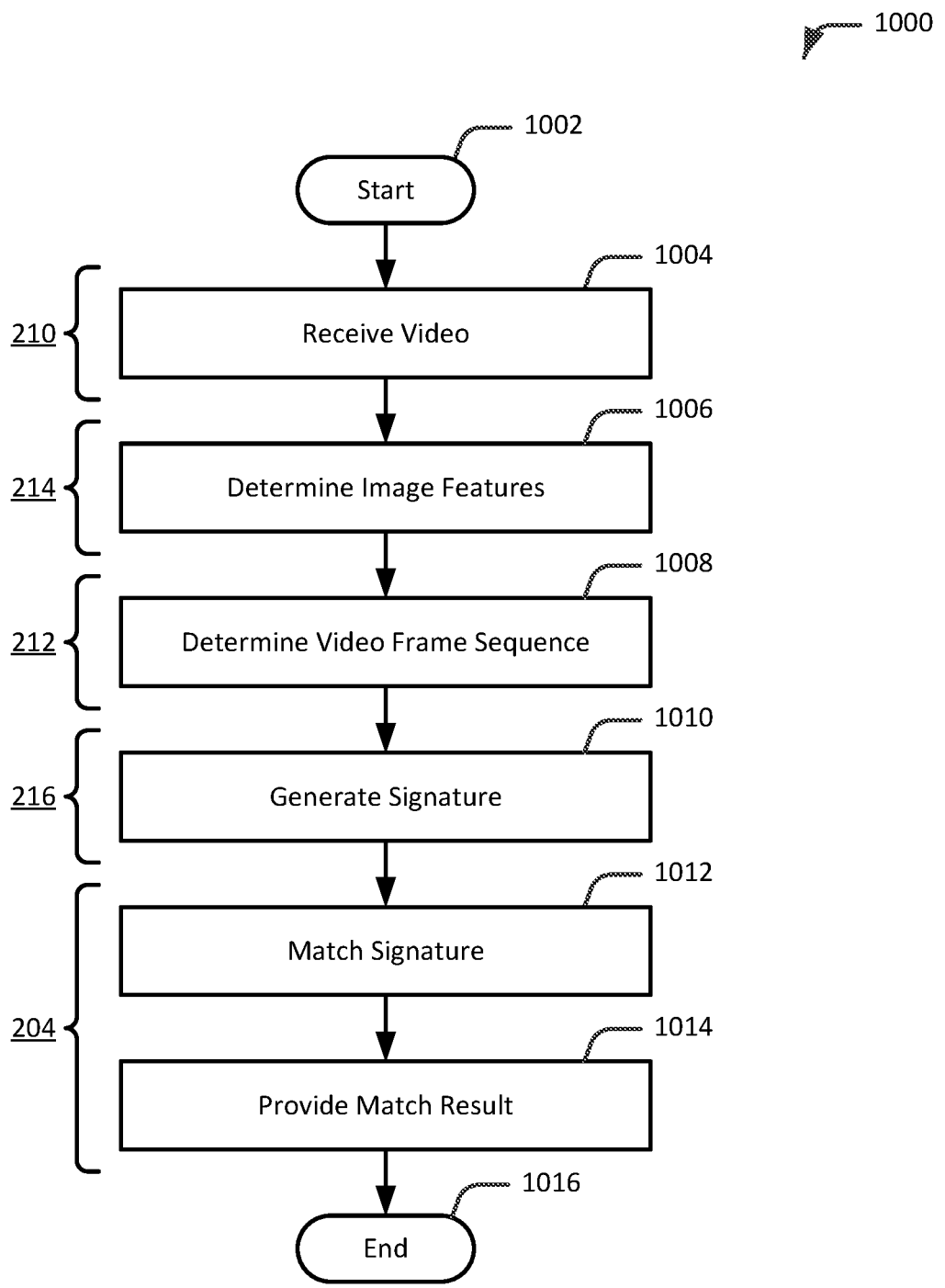
FIG. 10 is a flow diagram illustrating an example process to match a video signature, in accordance with an embodiment of the present disclosure.
Figure 11:
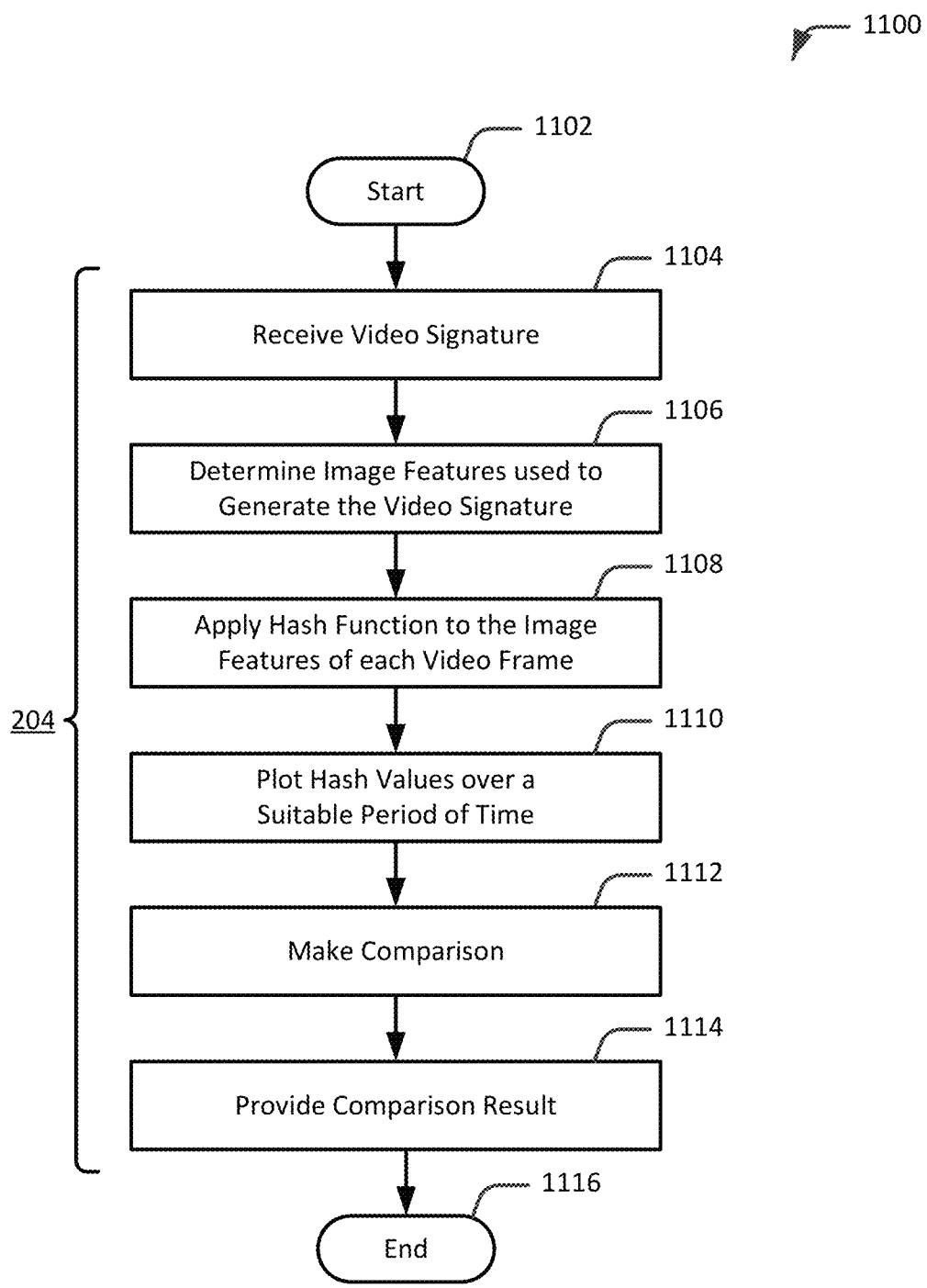
FIG. 11 is a flow diagram illustrating an example process to compare curves corresponding to respective videos, in accordance with an embodiment of the present disclosure.

FIG. 10 is a flow diagram illustrating an example process 1000 to match a video signature, in accordance with an embodiment of the present disclosure. FIG. 11 is a flow diagram illustrating an example process 1100 to compare curves corresponding to respective videos, in accordance with an embodiment of the present disclosure. The operations, functions, or actions illustrated in example process 1000 and example process 1100 may in some embodiments be performed by various components of video player device 202 and signature matching system 204 of FIG. 2. The operations, functions, or actions described in the respective blocks of example process 1000 and example process 1100 may also be stored as computer-executable instructions in a computer-readable medium, such as memory 1204 and/or data storage 1206 of a computing system 1200.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

With reference to example process 1000 of FIG. 10, process 1000 is initiated at block 1002. By way of an example use case, a user may request the playing of a video on a video playback device, such as video player device 202. Prior to starting the playing of the video, signature processing application 210 can generate a video signature of the video, and use the generated video signature to determine whether to proceed with the playing of the video as requested by the user.

At block 1004, the video may be received by or otherwise made available to signature processing application 210. At block 1006, feature selection module 214 determines the image features that are to be used in generating the video signature of the video. The specified image features, which may, for instance, be pixel values from a collection of pixels of a video frame or color schemes of selected tiles of a video frame to name two examples, are obtained from selected video frames of the video.

At block 1008, sequence selection module 212 determines a video frame sequence of the video from which to obtain the image features for generating a video signature of the video. For example, the determined video frame sequence may include all or a selected sequence of video frames of the video.

At block 1010, signature generation module 216 generates a video signature of the video using the specified image features obtained from the specified video frame sequence of the video. At block 1012, signature matching system 204 searches a corpus of reference videos for a reference video having a video signature that matches the video signature generated by signature generation module 216. For example, signature processing application 210 can provide or otherwise make available the generated video signature of the video to signature matching system 204, and request signature matching system 204 to determine whether the provided video signature matches a signature of a reference video. That is, signature processing application 210 can request signature matching system 204 to determine whether the provided video signature is that of a reference video. As will be appreciated in light of this disclosure, the video signatures of the reference videos that are being searched are generated in the same manner as the provided video signature that is being matched. That is, signature matching system 204 generates the video signatures of the reference videos using the same technique as that used by signature generation module 216 to generate the provided video signature that is being matched.

At block 1014, signature matching system 204 provides the match result to signature processing application 210. Signature processing application 210 can then take an appropriate action based on the provided match result. For example, if the corpus of reference videos is of pirated or otherwise illegal videos, signature processing application 210 can prohibit the playing of the video if the match result indicates as successful match. Process 1000 ends at block 1016.

In some embodiments, additional or alternative operations may be performed. For example, in one embodiment, a video player device, such as video player device 202, can provide or otherwise make available a video to signature matching system 204. This is in contrast to a video signature being generated by the video player device, for instance by a signature processing application of the video player device. In some such embodiments, signature matching system 204 can then generate a video signature of the provided video, and compare the video signature against video signatures of reference videos. In another embodiment, signature processing application 210 may additionally provide information regarding the generation of the video signature to signature matching system 204. This allows for signature processing application 210 to adaptively generate a video signature of a video based on various properties or attributes of the video. For example, the properties or attributes may be used to determine the image features and/or the video frame sequence to use in generating the video signature. For example, if the video is one in which there is a high degree of change in pixel values between video frames, then a smaller number of pixel values may be used to generate the video signature. In such embodiments, signature matching system 204 can use the provided information regarding the generation of the provided video signature to generate video signatures of the reference videos that are suitable for comparing (e.g., matching) with the provided video signature. In other such embodiments, signature matching system 204 can use the provided information regarding the generation of the provided video signature to select an appropriate video signature from a collection of pre-generated video signatures of each reference video.

With reference to example process 1100 of FIG. 11, process 1100 is initiated at block 1102. By way of an example use case, a user may request to download a video onto a computing device, such as video player device 202. Prior to downloading the requested video, signature processing application 210 can generate a video signature of the video, and request signature matching system 204 to determine whether the generated video signature is of a reference video, for example a reference video that is permitted to be downloaded by the user.

At block 1104, a video signature may be received by or otherwise made available to signature matching system 204. Continuing the above example, signature processing application 210 can generate a video signature of a video, and provide the generated video signature to signature matching system 204 with a request for signature matching system 204 to determine whether the provided video signature is that of a reference video.

At block 1106, signature matching system 204 determines the image features used to generate the received video signature. The image features, for example, can be determined from the received video signature. Signature matching system 204 can also determine the video frame sequence used to generate the received video signature, for instance, from the received video signature.

At block 1108, signature matching system 204 can apply a hash function to the determined image features of each video frame in the determined video frame sequence to generate a hash value for each video frame of the video frame sequence. At block 1110, signature matching system 204 can then plot the generated hash values for the video frames over a suitable period of time (e.g., for a suitable number of video frames). Plotting the hash values for a suitable number of video frames results in a plot of a derived curve that represents the video and, more specifically, the video frame sequence of the video.

At block 1112, signature matching system 204 compares the derived curve from the provided video signature to similarly derived curves corresponding to reference videos in a corpus of reference videos for a matching curve. Two matching curves signify that the two respective videos (the two videos that respectively correspond to the two matching curves) are the same video. At block 1114, signature matching system 204 provides the results of the comparison. Continuing the above example, signature matching system 204 can provide the comparison result to signature processing application 210 of video player device 202. Process 1100 ends at block 1116.

In some embodiments, a video player device, such as video player device 202, can provide or otherwise makes available a video to signature matching system 204. This is in contrast to a video signature being generated by the video player device, for instance by a signature processing application of the video player device. In some such embodiments, signature matching system 204 can then derive a curve for the provided video, and compare a plot of the derived curve to plots of similarly generated curves for reference videos to determine whether there is a reference video that matches the provided video.

Figure 12:
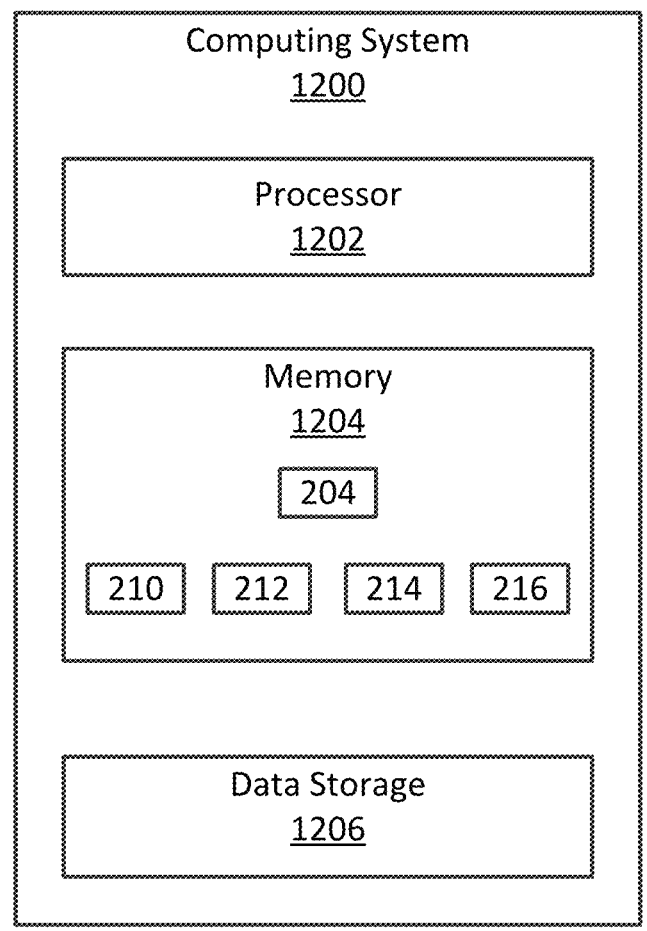
FIG. 12 illustrates selected components of an example computing system that may be used to perform any of the techniques as variously described in the present disclosure, according to an embodiment.

FIG. 12 illustrates selected components of example computing system 1200 that may be used to perform any of the techniques as variously described in the present disclosure, according to an embodiment. In some embodiments, computing system 1200 may be configured to implement or direct one or more operations associated with some or all of the engines, components and/or modules associated with system 200. For example, signature processing application 210 and/or signature matching system 204 may be implemented in and/or using computing system 1200. In one example case, for instance, signature processing application 210, including sequence selection module 212, feature selection module 214, and signature generation module 216 is loaded in memory 1204 and executable by a processor 1202. In another example case, for instance, signature matching system 204 is loaded in memory 1204 and executable by a processor 1202. Computing system 1200 may be any computer system, such as a workstation, desktop computer, server, laptop, handheld computer, tablet computer (e.g., the iPad™ tablet computer), mobile computing or communication device (e.g., the iPhone® mobile communication device, the Android® mobile communication device, and the like), or other form of computing or telecommunications device that is capable of video capture and/or communication and that has sufficient processor power and memory capacity to perform the operations described in this disclosure. A distributed computational system may be provided that includes a multiple of such computing devices. As depicted, computing system 1200 may include processor 1202, memory 1204, and data storage 1206. Processor 1202, memory 1204, and data storage 1206 may be communicatively coupled.

In general, processor 1202 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 1202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 12, processor 1202 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 1202 may be configured to interpret and/or execute program instructions and/or process data stored in memory 1204, data storage 1206, or memory 1204 and data storage 1206. In some embodiments, processor 1202 may fetch program instructions from data storage 1206 and load the program instructions in memory 1204. After the program instructions are loaded into memory 1204, processor 1202 may execute the program instructions.

For example, in some embodiments, any one or more of the engines, components and/or modules of system 200 may be included in data storage 1206 as program instructions. Processor 1202 may fetch some or all of the program instructions from data storage 1206 and may load the fetched program instructions in memory 1204. Subsequent to loading the program instructions into memory 1204, processor 1202 may execute the program instructions such that the computing system may implement the operations as directed by the instructions.

In some embodiments, virtualization may be employed in computing device 1200 so that infrastructure and resources in computing device 1200 may be shared dynamically. For example, a virtual machine may be provided to handle a process running on multiple processors so that the process appears to be using only one computing resource rather than multiple computing resources. Multiple virtual machines may also be used with one processor.

Memory 1204 and data storage 1206 may include computer-readable storage media for carrying or having computer-executable instructions or data structures stored thereon. Such computer-readable storage media may include any available media that may be accessed by a general-purpose or special-purpose computer, such as processor 1202. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 1202 to perform a certain operation or group of operations.

Modifications, additions, or omissions may be made to computing system 1200 without departing from the scope of the present disclosure. For example, in some embodiments, computing system 1200 may include any number of other components that may not be explicitly illustrated or described herein.

As indicated above, the embodiments described in the present disclosure may include the use of a special purpose or a general purpose computer (e.g., processor 1202 of FIG. 12) including various computer hardware or software modules, as discussed in greater detail herein. As will be appreciated, once a general purpose computer is programmed or otherwise configured to carry out functionality according to an embodiment of the present disclosure, that general purpose computer becomes a special purpose computer. Further, as indicated above, embodiments described in the present disclosure may be implemented using computer-readable media (e.g., memory 1204 of FIG. 12) for carrying or having computer-executable instructions or data structures stored thereon.

Numerous example variations and configurations will be apparent in light of this disclosure. According to some examples, computer-implemented methods to generate a video signature of a video are described. An example computer-implemented method may include: determining a video frame sequence of a video to use in generating a video signature, wherein the video frame sequence includes multiple video frames; determining pixel values of a subset of pixels of each video frame of the video frame sequence, wherein the subset of pixels of a video frame excludes all pixels of the video frame; and generating the video signature of the video based on the determined pixel values, wherein the video signature is representative of the pixel values of the subset of pixels of each video frame in the sequence of video frames.

In some examples, the subset of pixels is a collection of pixels within a specified distance a center of each video frame of the video frame sequence. In other examples, the subset of pixels is a collection of pixels in a region of a video frame having a relatively higher expected video frame to video frame color variance. In still other examples, the subset of pixels is determined based on a length of the video. In yet other examples, the subset of pixels is determined based on a length of the video frame sequence. In further examples, the subset of pixels is determined based on locations of the subset of pixels. In still further examples, the video frame sequence includes all video frames of the video. In yet further examples, the video frame sequence includes a sequence of a subset of video frames of the video, wherein the subset of video frames includes multiple video frames excluding all video frames in the video. In other examples, the method may also include, responsive to a determination that the video signature matches at least one video signature of one or more video signatures of reference videos, recording identification of the video. In still other examples, the method may also include: deriving a curve for the video based on the determined pixel values of the subset of pixels and the video frame sequence; and comparing the derived curve with one or more curves corresponding to respective one or more reference videos.

According to some examples, computer program products including one or more non-transitory machine readable mediums encoded with instructions that when executed by one or more processors cause a process to be carried out to generate a video signature of a video are described. An example process may include: determining a video frame sequence of a video to use in generating a video signature, wherein the video frame sequence includes multiple video frames; determining pixel values of a subset of pixels of each video frame of the video frame sequence, wherein the subset of pixels of a video frame excludes all pixels of the video frame; and generating the video signature of the video based on the determined pixel values, wherein the video signature is representative of the pixel values of the subset of pixels of each video frame in the sequence of video frames.

In some examples, the subset of pixels is a collection of pixels within 25,000 pixels of a center of each video frame of the video frame sequence. In other examples, the subset of pixels is determined based on at least one of a length of the video, a length of the video frame sequence, and locations of the subset of pixels. In still other examples, the video frame sequence includes a sequence of a subset of video frames of the video, wherein the subset of video frames includes multiple video frames excluding all video frames in the video. In yet other examples, the process may also include, responsive to a determination that the video signature fails to match at least one video signature of one or more video signatures of reference videos, prohibiting use of the video. In further examples, the process may also include: deriving a curve for the video based on the determined pixel values of the subset of pixels and the video frame sequence; and comparing the derived curve with one or more curves corresponding to respective one or more reference videos.

According to some examples, systems to generate a video signature of a video are described. An example system may include: one or more processors; a sequence selection module at least one of controllable and executable by the one or more processors, and configured to determine a video frame sequence of a video to use in generating a video signature, wherein the video frame sequence includes multiple video frames; a feature selection module at least one of controllable and executable by the one or more processors, and configured to determine pixel values of a subset of pixels of each video frame of the video frame sequence, wherein the subset of pixels of a video frame excludes all pixels of the video frame; and a signature generation module at least one of controllable and executable by the one or more processors, and configured to generate the video signature of the video based on the determined pixel values, wherein the video signature is representative of the pixel values of the subset of pixels of each video frame in the sequence of video frames.

In some examples, the subset of pixels is a collection of pixels within a specified distance from a center of each video frame of the video frame sequence. In other examples, the subset of pixels is determined based on at least one of a length of the video, a length of the video frame sequence, and locations of the subset of pixels. In still other examples, the video frame sequence includes a sequence of a subset of video frames of the video, wherein the subset of video frames includes multiple video frames excluding all video frames in the video.

According to some examples, computer-implemented methods to generate a video signature of a video are described. An example computer-implemented method may include: determining a video frame sequence of a video to use in generating a video signature, wherein the video frame sequence includes multiple video frames; determining a color scheme of each video frame of the video frame sequence, wherein the color scheme includes one or more predominant colors present in each video frame of the video frame sequence; and generating the video signature of the video based on the determined color scheme.

In some examples, the color scheme is of a tile of each video frame of the video frame sequence. In other examples, the tile is a logical division of each video frame of the video frame sequence. In still other examples, the color scheme is a first color scheme, and the tile is a first tile, and the method may also include: determining a second color scheme of a second tile of each video frame of the video frame sequence; and generating the video signature of the video based on the determined first color scheme and the second color scheme. In further examples, the video frame sequence includes all video frames of the video. In still further examples, the video frame sequence includes a sequence of a subset of video frames of the video, wherein the subset of video frames includes multiple video frames excluding all video frames in the video. In yet further examples, the method may also include, responsive to a determination that the video signature matches at least one video signature of one or more video signatures of reference videos, prohibiting use of the video. In other examples, the method may also include: deriving a curve for the video based on the determined color scheme of each video frame of the video frame sequence; comparing the derived curve with one or more curves corresponding to respective one or more reference videos; and taking an appropriate action based on a result of the comparing.

According to some examples, computer program products including one or more non-transitory machine readable mediums encoded with instructions that when executed by one or more processors cause a process to be carried out to generate a video signature of a video are described. An example process may include: determining a video frame sequence of a video to use in generating a video signature, wherein the video frame sequence includes multiple video frames; determining a color scheme of each video frame of the video frame sequence, wherein the color scheme includes one or more predominant colors present in each video frame of the video frame sequence; and generating the video signature of the video based on the determined color scheme.

In some examples, the color scheme is of a tile of each video frame of the video frame sequence. In other examples, the tile is a logical division of each video frame of the video frame sequence. In still other examples, the color scheme includes a specified number of predominant colors. In further examples, the video frame sequence includes a sequence of a subset of video frames of the video, wherein the subset of video frames includes multiple video frames excluding all video frames in the video. In yet other examples, the process may also include, responsive to a determination that the video signature fails to match at least one video signature of one or more video signatures of reference videos, prohibiting use of the video. In other examples, the process may also include: deriving a curve for the video based on the determined color scheme of each video frame of the video frame sequence; and comparing the derived curve with one or more curves corresponding to respective one or more reference videos.

According to some examples, systems to generate a video signature of a video are described. An example system may include: one or more processors; a sequence selection module at least one of controllable and executable by the one or more processors, and configured to determine a video frame sequence of a video to use in generating a video signature, wherein the video frame sequence includes multiple video frames; a feature selection module at least one of controllable and executable by the one or more processors, and configured to determine a color scheme of each video frame of the video frame sequence, wherein the color scheme includes one or more predominant colors present in each video frame of the video frame sequence; and a signature generation module at least one of controllable and executable by the one or more processors, and configured to generate the video signature of the video based on the determined color scheme.

In some examples, the color scheme is of a tile of each video frame of the video frame sequence, the tile being a logical division of each video frame. In other examples, the color scheme includes a specified number of predominant colors. In still other examples, the video frame sequence includes a sequence of a subset of video frames of the video, wherein the subset of video frames includes multiple video frames excluding all video frames in the video.

According to some examples, computer-implemented methods to generate a video signature of a video are described. An example computer-implemented method may include: determining image features to use in generating the video signature, the image features being derived from a portion of the video; determining a video frame sequence of the video to use in generating the video signature, wherein the video frame sequence includes multiple video frames; and generating the video signature of the video based on the determined image features and the video frame sequence, wherein the video signature is representative of the image features of the portion of the video in the sequence of video frames.

In some examples, the image features include pixel values from a subset of pixels of each video frame of the video frame sequence. In other examples, the subset of pixels is a collection of pixels within a specified distance of a center of each video frame of the video frame sequence. In still other examples, the image features include a color scheme of each video frame of the video frame sequence, wherein the color scheme includes one or more predominant colors present in each video frame of the video frame sequence. In yet other examples, the color scheme is of a tile of each video frame of the video frame sequence. In further examples, the tile is a logical division of each video frame of the video frame sequence. In still further examples, the color scheme includes a specified number of predominant colors. In yet further examples, the video frame sequence includes all video frames of the video. In other examples, the video frame sequence includes a sequence of a subset of video frames of the video, wherein the subset of video frames includes multiple video frames excluding all video frames in the video. In still other examples, the method may also include, responsive to a determination that the video signature matches at least one video signature of one or more video signatures of reference videos, prohibiting use of the video. In yet other examples, the method may also include: deriving a curve for the video based on the determined image features and the video frame sequence; and comparing the derived curve with one or more curves corresponding to respective one or more reference videos.

According to some examples, computer program products including one or more non-transitory machine readable mediums encoded with instructions that when executed by one or more processors cause a process to be carried out to generate a video signature of a video are described. An example process may include: determining image features to use in generating the video signature, the image features being derived from a portion of the video; determining a video frame sequence of the video to use in generating the video signature, wherein the video frame sequence includes multiple video frames; and generating the video signature of the video based on the determined image features and the video frame sequence, wherein the video signature is representative of the image features of the portion of the video in the sequence of video frames.

In some examples, the image features include pixel values from a subset of pixels of each video frame of the video frame sequence, the subset of pixels being near a center of each video frame of the video frame sequence. In other examples, the image features include a color scheme of a tile of each video frame of the video frame sequence, wherein the color scheme includes one or more predominant colors present in each video frame of the video frame sequence. In still other examples, the video frame sequence includes a sequence of a subset of video frames of the video, wherein the subset of video frames includes multiple video frames excluding all video frames in the video. In yet other examples, the process may also include, responsive to a determination that the video signature matches at least one video signature of one or more video signatures of reference videos, prohibiting use of the video. In further examples, the process may also include: deriving a curve for the video based on the determined image features and the video frame sequence; and comparing the derived curve with one or more curves corresponding to respective one or more reference videos.

According to some examples, systems to generate a video signature of a video are described. An example system may include: one or more processors; a feature selection module at least one of controllable and executable by the one or more processors, and configured to determine image features to use in generating the video signature, the image features being derived from a portion of the video; a sequence selection module at least one of controllable and executable by the one or more processors, and configured to determine a video frame sequence of the video to use in generating the video signature, wherein the video frame sequence includes multiple video frames; and a signature generation module at least one of controllable and executable by the one or more processors, and configured to generate the video signature of the video based on the determined image features and the video frame sequence, wherein the video signature is representative of the image features of the portion of the video in the sequence of video frames.

In some examples, the image features include one of pixel values from a subset of pixels of each video frame of the video frame sequence or a color scheme of each video frame of the video frame sequence, wherein the color scheme includes one or more predominant colors present in each video frame of the video frame sequence. In other examples, the video frame sequence includes a sequence of a subset of video frames of the video, wherein the subset of video frames includes multiple video frames excluding all video frames in the video.

According to some examples, systems to generate a video signature of a video are described. An example system may include: a feature selection module to determine image features to use in generating the video signature, the image features being derived from a portion of the video; a sequence selection module to determine a video frame sequence of the video to use in generating the video signature; and a signature generation module to generate the video signature of the video based on the determined image features and the video frame sequence.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method to generate a video signature of a video, the method comprising:
   determining a subset of video frames to use in generating a video signature of a video that includes the subset of video frames, wherein each video frame in the subset of video frames comprises a plurality of pixels;
   determining a subset of pixels that comprise each video frame in the subset of video frames, wherein the subset of pixels is also used in generating the video signature;
   determining, for each video frame in the subset of video frames, a pixel value for each pixel in the subset of pixels, wherein the pixel values define a visual appearance of the corresponding pixel; and
   generating the video signature of the video, wherein the video signature includes the determined pixel values for each video frame in the subset of video frames.

2. The method of claim 1, wherein pixel values are determined for certain pixels within a specified distance from a center of each video frame in the subset of video frames.

3. The method of claim 1, wherein pixel values are determined for certain pixels in a video frame region having a video frame to video frame color variance that is greater than a threshold variance.

4. The method of claim 1, wherein the subset of pixels includes a quantity of pixels that is determined based on one of a length of the video, a quantity of video frames in the subset of video frames, and locations of pixels in the subset of pixels.

5. The method of claim 1, wherein the subset of video frames are noncontiguous in the video.

6. The method of claim 1, further comprising:
   making a determination that the video signature matches a video signature of a reference video; and
   in response to making the determination, recording identification of the video.

7. The method of claim 1, further comprising:
   deriving a curve for the video based on the determined pixel values, wherein the derived curve is a plot of the determined pixel values on a first axis and an index of video frames in the subset of video frames on a second axis; and
   comparing the derived curve with one or more curves corresponding to respective one or more reference videos.

8. A system to generate a video signature of a video, the system comprising:
   a sequence selection module to determine a video frame sequence of the video to use in generating the video signature, wherein the video frame sequence comprises a plurality of video frames;
   a feature selection module to
      determine a subset of pixels that comprise each video frame in the video frame sequence, wherein the subset of pixels comprises a plurality of pixels, and
      determine, for at least some of the video frames in the video frame sequence, a pixel value for each pixel in the subset of pixels,
      wherein the pixel values define a visual appearance of the corresponding pixel, and wherein the subset of pixels is also used in generating the video signature; and a signature generation module to generate the video signature, wherein the video signature includes the determined pixel values.

9. The system of claim 8, wherein the pixel values are determined for each video frame of the video frame sequence.

10. The system of claim 9, wherein the subset of pixels is a collection of pixels within a distance from a center of each video frame of the video frame sequence.

11. The system of claim 8, wherein the pixel values define a color scheme of each video frame of the video frame sequence.

12. The system of claim 11, wherein the color scheme is of a tile of each video frame of the video frame sequence.

13. The system of claim 11, wherein the color scheme includes a specified number of dominant colors.

14. A computer-implemented method to generate a video signature of a video, the method comprising:
   determining a subset of video frames to use in generating a video signature of a video that includes the subset of video frames, wherein each video frame in the subset of video frames comprises a plurality of pixels;
   determining a subset of pixels that comprise each video frame in the subset of video frames;
   determining, for a particular video frame in the subset of video frames, a pixel value for each pixel in the subset of pixels, wherein the pixel values define a predominant color present in the particular video frame; and
   generating the video signature of the video, wherein the video signature includes the determined pixel values for each video frame in the subset of video frames.

15. The method of claim 14, wherein the predominant color is of a tile of each video frame in the subset of video frames.

16. The method of claim 15, wherein the tile is a logical division of each video frame in the subset of video frames.

17. The method of claim 15, further comprising determining, for the particular video frame, a second pixel value for each pixel in the subset of pixels, wherein the second pixel values define a second predominant color present in the particular video frame.

18. The method of claim 14, wherein the subset of video frames are noncontiguous in the video.

19. The method of claim 14, further comprising:
   making a determination that the video signature matches a video signature of a reference video; and
   in response to making the determination, prohibiting use of the video.

20. The method of claim 14, further comprising:
   deriving a curve for the video based on the determined pixel values of each video frame in the subset of video frames; and
   comparing the derived curve with one or more curves corresponding to respective one or more reference videos.

* * * * *